(12) United States Patent
Huisma

(10) Patent No.: US 8,930,148 B2
(45) Date of Patent: Jan. 6, 2015

(54) ANIMAL IDENTIFICATION, MEASUREMENT, MONITORING AND MANAGEMENT SYSTEM

(75) Inventor: Camiel Huisma, Airdrie (CA)

(73) Assignee: GrowSafe Systems Ltd., Airdrie, Alberta (CA)

( * ) Notice: Subject to any disclaimer, the term of this patent is extended or adjusted under 35 U.S.C. 154(b) by 595 days.

(21) Appl. No.: 13/253,570

(22) Filed: Oct. 5, 2011

(65) Prior Publication Data
US 2012/0089340 A1    Apr. 12, 2012

Related U.S. Application Data

(60) Provisional application No. 61/390,803, filed on Oct. 7, 2010.

(51) Int. Cl.
*G01N 33/48* (2006.01)
*A01K 1/00* (2006.01)
*A01K 29/00* (2006.01)
*A01K 5/02* (2006.01)

(52) U.S. Cl.
CPC ............. *A01K 29/005* (2013.01); *A01K 5/02* (2013.01)
USPC ........................................ 702/19; 119/51.02

(58) Field of Classification Search
USPC .................................... 702/17–179, 188–189; 119/51.01–51.02, 842; 340/573.1, 340/573.3; 426/2
See application file for complete search history.

(56) References Cited

U.S. PATENT DOCUMENTS

| 2005/0161007 | A1* | 7/2005 | Huisma et al. ................. 119/842 |
| 2007/0137584 | A1 | 6/2007 | Travis |
| 2009/0187349 | A1 | 7/2009 | Mainini |

* cited by examiner

*Primary Examiner* — Toan Le
(74) *Attorney, Agent, or Firm* — Davis & Bujold, PLLC; Michael J. Bujold

(57) ABSTRACT

A highly automated system and method for acquiring animal consumption and behavior data including stations where consumables are fed to animals. The stations being equipped with RFID equipment for reading RFID tags in close proximity to the station, and weighing devices for measuring the weight of the consumables. The RFID equipment and the weighing device are connected to a computer which calculates the weight of the trough at specific times by using weight data collected before and after the specified time to enhance the accuracy of the weight measurement. The computer uses a "mathematical weighted filter technique" to estimate the weight of the trough before and after a consumption event. The computer uses a method to divide the reduction/increase in weighed matter between the RFID tag last seen and the next RFID tag appearing, providing the reduction/increase in matter is less than a specified amount.

20 Claims, 9 Drawing Sheets

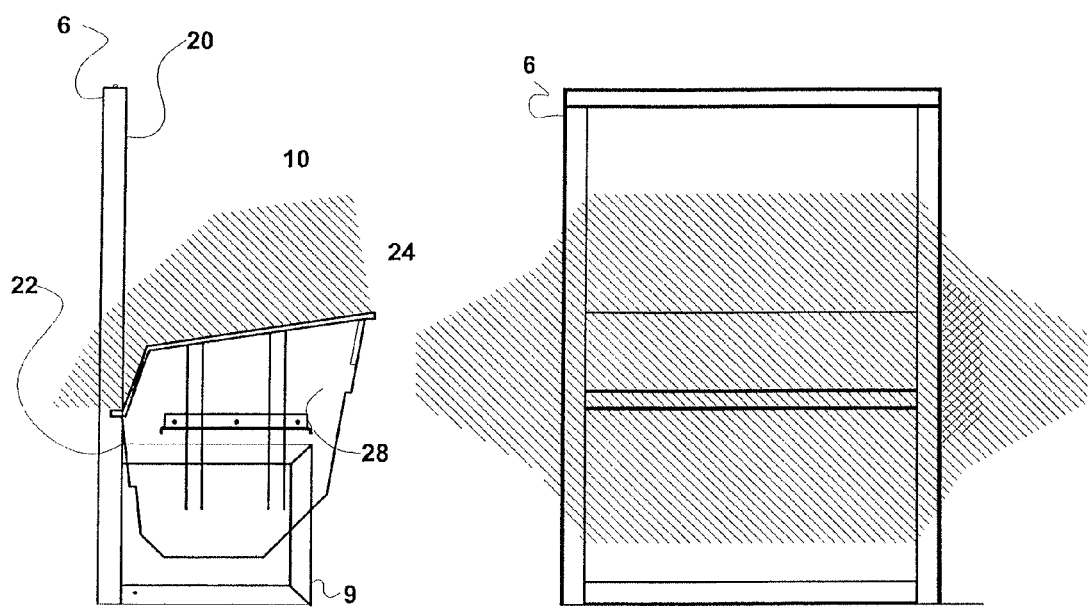
Fig. 2                    Fig. 3

Fig. 8

| Time (hr:min:sec) | Measured Weight MW (kg) | Set of MW for calculating Filtered Weight FW (kg) | Set of MW ordered low to high (kg) | 4th MW of set equals FW at T1 (kg) | Set of MW for calculating Filtered Weight FW (kg) | Set of MW ordered low to high (kg) | 4th MW of set equals FW at T2 (kg) |
|---|---|---|---|---|---|---|---|
| 9:12:00 | 47.90 | 47.90 | 47.80 | | | | |
| 9:12:01 | 47.90 | 47.90 | 47.875 | | | 47.80 | |
| 9:12:02 | 47.90 | 47.90 | 47.875 | | | 47.80 | |
| 9:12:03 | 47.90 | 47.90 | 47.875 | | | 47.875 | |
| 9:12:04 | 47.90 | 47.90 | 47.875 | | | 47.875 | 47.875 |
| 9:12:05 T1 | 47.875 | 47.875 | 47.90 | 47.875 | 47.90 | 47.875 | |
| 9:12:06 T2 | 47.875 | 47.875 | 47.90 | | 47.90 | 47.875 | |
| 9:12:07 T3 | 47.875 | 47.875 | 47.90 | | 47.875 | 47.90 | |
| 9:12:08 T4 | 47.875 | 47.875 | 47.90 | | 47.875 | 47.90 | |
| 9:12:09 T5 | 48.45 | 48.45 | 48.45 | | 48.45 | 47.90 | |
| 9:12:10 T6 | 47.80 | 47.80 | | | 47.80 | 48.45 | |
| 9:12:11 | 47.80 | | | | 47.80 | | |
| 9:12:12 | 47.80 | | | | | | |
| 9:12:13 | 47.80 | | | | | | |
| 9:12:14 | 47.80 | | | | | | |
| 9:12:15 | 47.80 | | | | | | |

Fig. 9

| Time (hr:min:sec) | Measured Weight MW (kg) | Set of MW for calculating Filtered Weight FW (kg) | Set of MW ordered low to high (kg) | 4th MW of set equals FW at T3 (kg) | Set of MW for calculating Filtered Weight FW (kg) | Set of MW ordered low to high (kg) | 4th MW of set equals FW at T4 (kg) |
|---|---|---|---|---|---|---|---|
| 9:12:00 | 47.90 | | | | | | |
| 9:12:01 | 47.90 | | | | | | |
| 9:12:02 | 47.90 | 47.90 | 47.80 | | | | |
| 9:12:03 | 47.90 | 47.90 | 47.80 | | 47.90 | 47.80 | |
| 9:12:04 | 47.90 | 47.90 | 47.80 | | 47.90 | 47.80 | |
| 9:12:05 T1 | 47.875 | 47.875 | 47.875 | | 47.875 | 47.80 | |
| 9:12:06 T2 | 47.875 | 47.875 | 47.875 | 47.875 | 47.875 | 47.80 | 47.80 |
| 9:12:07 T3 | 47.875 | 47.875 | 47.875 | | 47.875 | 47.875 | |
| 9:12:08 T4 | 47.875 | 47.875 | 47.90 | | 47.875 | 47.875 | |
| 9:12:09 T5 | 48.45 | 48.45 | 47.90 | | 48.45 | 47.875 | |
| 9:12:10 T6 | 47.80 | 47.90 | 48.45 | | 47.80 | 47.875 | |
| 9:12:11 | 47.80 | 47.80 | | | 47.80 | 47.90 | |
| 9:12:12 | 47.80 | 47.80 | | | 47.80 | 47.90 | |
| 9:12:13 | 47.80 | | | | 47.80 | 48.45 | |
| 9:12:14 | 47.80 | | | | | | |
| 9:12:15 | 47.80 | | | | | | |

Fig. 10

| Time (hr:min:sec) | Measured Weight MW (kg) | Set of MW for calculating Filtered Weight FW (kg) | Set of MW ordered low to high (kg) | 4th MW of set equals FW at T5 (kg) | Set of MW for calculating Filtered Weight FW (kg) | Set of MW ordered low to high (kg) | 4th MW of set equals FW at T6 (kg) |
|---|---|---|---|---|---|---|---|
| 9:12:00 | 47.90 | | | | | | |
| 9:12:01 | 47.90 | | | | | | |
| 9:12:02 | 47.90 | | | | | | |
| 9:12:03 | 47.90 | | | | | | |
| 9:12:04 | 47.90 | 47.90 | 47.80 | | | | |
| 9:12:05 T1 | 47.875 | 47.875 | 47.80 | | 47.875 | 47.80 | |
| 9:12:06 T2 | 47.875 | 47.875 | 47.80 | | 47.875 | 47.80 | |
| 9:12:07 T3 | 47.875 | 47.875 | 47.80 | 47.80 | 47.875 | 47.80 | |
| 9:12:08 T4 | 47.875 | 47.875 | 47.875 | | 48.45 | 47.80 | 47.80 |
| 9:12:09 T5 | 48.45 | 48.45 | 47.875 | | 47.80 | 47.80 | |
| 9:12:10 T6 | 47.80 | 47.80 | 47.875 | | 47.80 | 47.875 | |
| 9:12:11 | 47.80 | 47.80 | 47.90 | | 47.80 | 47.875 | |
| 9:12:12 | 47.80 | 47.80 | 48.45 | | 47.80 | 47.875 | |
| 9:12:13 | 47.80 | 47.80 | | | 47.80 | 47.875 | |
| 9:12:14 | 47.80 | 47.80 | | | 47.80 | 47.875 | |
| 9:12:15 | 47.80 | | | | 47.80 | 48.45 | |

US 8,930,148 B2

ANIMAL IDENTIFICATION, MEASUREMENT, MONITORING AND MANAGEMENT SYSTEM

This application claims the benefit of provisional application No. 61/390,803 filed Oct. 7, 2010.

FIELD OF THE INVENTION

This invention relates to an animal identification, measurement, monitoring and management system and a method of using the same in an animal production environment and, more specifically, a system which is capable of being used with multiple transmitters to monitor automatically and continuously the consumption and the behavior of individual animals in order to predict and determine a variety of conditions relating to health, performance, and production efficiency enabling determination of individual animal performance on different rations, response to medications, response to feed supplements, response to minerals and trace minerals, response to growth promoting substances, prediction of carcass quality, and determination of greenhouse gas and manure excretion.

BACKGROUND OF THE INVENTION

Radio Frequency Identification

Over the past forty years or so radio frequency identification has been used to automatically identify objects. One example of a practical application of this technology has resulted in electronic identification of individual animals. The basic elements of such systems include a reader/transmitter, an antenna and a transponder. The reader/transmitter sends an electromagnetic wave through the antenna to the transponder, which uses this energy to transmit a radio frequency signal back through the antenna to the reader/transmitter. Typically, the signal includes an identification code unique to each transponder. In order to monitor the activities of large herds or confined groupings of animals, one must be able to monitor multiple transponders in a relatively small area. With currently available technology, it is extremely difficult to read multiple transponders using one reader/transmitter.

If each one of the multiple transponders uses the same frequency to transmit its unique identification code back to the reader/transmitter, a single reader/transmitter is unable to readily decipher each individual identification code. In order to make systems with multiple transponders operational, multiple reader/transmitters are required which, in turn, render such systems costly, and will also reduce the area in which the transponders can be simultaneously read.

Measuring Feed Intake—Previous Generation Feed Intake Measurement

A rudimentary way to measure individual feed or water intake has been to house animals individually and record consumption by measuring and manually recording the feed supplied minus the feed refused or remaining. This method is both labor intensive and cost prohibitive. Studies in both swine and cattle have demonstrated that individually housed animals alter their performance significantly from those fed in production environments.

The first generation of electronic feeders acted on the same principle as manual recording. These systems isolate one animal to an individual feeding gate or stall. When the animal enters the stall, the starting trough weight is recorded and, when the animal leaves, the end trough weight is recorded. The difference between starting weight and end weight is determined to equal the feed intake. Although a gross measurement of what feed disappeared during the time the animal entered and left the feeding stall, this measurement does not take into account what precisely happened during the time period.

The methodology is further compromised when the access to the trough is open at all times and RFID is utilized to identify the animal. RFID is position sensitive and, therefore, might require a variable amount of time to read, compromising the start of the event. Other issues complicating the use of RFID, particularly when measuring visitation by an individual animal to a trough is that the RFID reading field often extends to one or more adjacent trough areas. It is therefore possible when the animal has its head close to one side or the other of a feeding trough that the adjacent RFID antenna also reads the adjacent animal's RFID tag and this potentially creates reading/calculation problems.

These first generation systems typically must be housed in barns providing protection from wind and other environmental conditions adding significantly to the cost of measurement. On a windy day for example, the wind or air pressure applied to the trough often varies by 10N. Such pressure variation becomes very problematic when trying to weigh a typical feed intake meal event normally about 800 grams.

In addition, birds, rodents, etc., and consume some of the food in the trough and such loss of food will lead to inaccurate food consumption determinations. In particular, studies have estimated that the food eaten by starlings, for example, can be as much as 6% to 12% of the food presented to animals.

It is to be appreciated that little to no behavioral information is acquired by these first generation systems. Inter-meal activity is not recorded. The effect of animal competition, on intake feeding behavior, is not adequately measured and feeding rates are normally considered to be constant during a feeding event. In terms of behavioral measurement, perhaps the most limiting factor is that the equipment determines what a feeding event or meal event is, by virtue of an animal visit being recorded by the equipment.

An other issue, arising from the use of such equipment, is that typical feeding behaviors are severely modified by the design of the measurement device itself. The animal may only be allowed to visit its specific feed stall to record consumption. Or when two animals wish to enter the trough at the same time, none of the animals will gain access. To overcome the limitations of the system to read multiple tags in close proximity, the system prevents access to feed.

Several of these early generation systems did not include a method to account for feed appearing in the trough. Some tried to properly account for feed appearing by using deflectors that kept animals from the bunks when troughs were being filled. Animals were refused entrance when feed resupplying occurred.

The first generation systems did not include the ability to audit or assess the accuracy of measurements. Several researchers have developed generalized and average statistical assumptions to overcome errors occurring in the first generation systems. In scientific literature, incorrect data is usually adjusted per visit. (e.g., De Haer et al., 1992). Some studies correct for measurement error by estimating individual feed intake of animals and tolerance factors based on those taken in group feeding studies. This circular reasoning does not improve measurement accuracy though data may fit what the researcher perceives to be true based on prior research in group settings.

Background to Feeding Behavior Measurement

In the early 1990s GrowSafe Systems Ltd, ("GrowSafe") developed a computerized data acquisition system that could electronically identify and monitor ostrich chicks. Chicks would visit the feeder about 500 times per day. When chicks became ill, feeding behavior visitation dropped rapidly, declining to about 50 visits per day. This decline in visitations could be trended over a very short time interval, usually within about 4-12 hours. In response to GrowSafe data triggers, avian specialists developed responsive treatment protocols. Using the GrowSafe technology and responsive animal health treatment protocols incorporated therein, the survival rate of the subjects tested improved from 8% to more than 90% (Huisma anecdotal 1993).

Early findings in cattle research, using GrowSafe technology, indicated similar early predictive abilities using animal behavior to identify illnesses at an earlier point in time than otherwise possible. From 1993 to 2000 a significant body of work was compiled by researchers using first generation GrowSafe behavior research technology indicating that feeding behavior patterns, of morbid and non-morbid calves, differ and could be measured (Basarab, 1996); and that the technology had the potential to identify morbid animals before any overt disease symptoms could be detected (Quimby 1999). Research determined that the economic value of morbid calves could be as much as US$0.19 to $0.35 less per kg than for healthy calves (Sowell 1999).

The technological transition from a GrowSafe system that could measure a small bird confined in a controlled environment to a large animal in the cattle environment was extremely complex and required the adaptation and development of new electronics, wireless communication methods, and data acquisition and analysis techniques. Many of these methods are currently protected by patents issued or assigned to GrowSafe Systems Ltd.

Feeding Behaviour and Sickness Identification

Researchers have traditionally viewed behavioral changes as simple signs of the debilitate effects of disease. (Weary 2009). Results from several key studies now indicate (1) sickness behavior is a motivational state; (2) sickness behavior is a well-organized adaptive response to infection; (3) cytokines produced by activated leukocytes induce sickness behavior; and (4) cytokines transmit messages from the periphery to the brain using humoral and neural pathways (Johnson 2002). Over the past decade, a substantial shift in thinking about behavioral concepts relating to animal health has occurred.

Identifying sick animals, early in the course of the disease, can be one of the toughest jobs in livestock production. When treated early, most animals have an excellent chance at survival but if an animal is sick for even a few days, treatment regimens are less likely to be effective. The recognition in declines of feed intake can assist with the identification of sick animals. In recent years there has been an increased interest in behavioral indicators of disease. A decrease or change in feeding patterns are usually symptoms of sick individuals. Research has demonstrated decreases in the carcass value of sick animals between animals that have not been treated and those that have been treated once, twice and three times respectively (Schneider 2009). The value of rapid diagnosis and treatment of disease increases when cattle are sold on carcass merit basis because of the negative effects of disease on carcass traits (Larson 2005).

Several epidemiological studies have indicated that even with increased pharmaceutical use, the incidence of morbidity and mortality in feedyards has increased. Total feedlot deaths in 2003 increased by 69% when compared to those in 1994. Bovine Respiratory Disease (BRD deaths more than doubled (118%) during same time period (Loneragan 2008).

Research indicates that the timing of initial BRD treatment is associated with performance and health outcomes (Babcock 2009) The effectiveness of antimicrobials in the treatment of BRD depends primarily on early recognition and treatment (Apley 2007 Cusack 2003). BRD manifests its economic losses cumulatively, through the cost of treatment, the cost of lost production, and loss due to death, thus emphasizing the importance of prevention and treatment of BRD as early as possible.

Feed Efficiency

For many years, genetic selection programs have focused on production (output) traits, with little attention given to production costs (inputs). Recently, this view has begun to change, and the efficiency of conversion of feed (i.e., the amount of product per unit of feed input) has been recognized as more important.

Within any beef cattle operation, feed costs are undoubtedly the main concern since they typically account for about 60-65% of the total costs of production. Because of the large costs associated with feed, increasing the efficiency of feed has been targeted as a means of improving the profitability of the beef industry. One estimate of feed efficiency is the feed conversion ratio. Traditionally, this was expressed as a feed:gain ratio, but this led to the confusing result that a higher ratio meant a lower efficiency. Today, to overcome this problem, the feed conversions are often expressed as a gain:feed ratio. Even so, results can be misleading, because these ratios are closely correlated to the intake and rate of gain of the animal (Carstens et al., 2004).

Two animals might have a similar gain:feed ratio and still be very different in their feed intakes and rates of gain. Conversely, the same animal at different intakes would certainly have different gain:feed ratios, even though the genetics of the animal had not changed. Therefore, gain:feed ratios have never been widely recognized as a criterion for genetic selection. Residual feed intake (RFI), defined as actual feed intake minus the expected feed intake of each animal, was first proposed as an alternate measure of feed efficiency by Koch et al. (1963). It can be defined, in other words, as the difference between actual feed intake and the expected feed requirements for maintenance of body weight and for weight gain. In contrast to gain:feed, residual feed intake is independent of growth and maturity patterns. Therefore, RFI should be a more sensitive and precise measurement of feed utilization, since it is based on energy intake and energy requirements.

RFI is an individual animal record, taking into account feeding trials. Accurate measurements of daily feed consumed must be made as well as average daily gain. Research has found that there is considerable variation in individual animal feed intakes, both above and below that which is expected or predicted on the basis of size and growth. These findings, along with the fact that individual animals of the same body weight require rather widely differing amounts of feed for the same level of production establishes the scientific base for measuring RFI in beef cattle. (Sainz et al, 2004).

Manure and GHG Emission Reduction

Relative to high RFI cattle, low RFI cattle have been shown to emit less methane—a potent greenhouse gas (GHG). Scientific evidence indicates that a reduction in methane and manure production can be achieved by with a low RFI that is through the reduction in feed intake (Arthur 2009).

Animal Welfare

Animal welfare is a complex issue that includes important scientific, economic and ethical considerations. This issue has the potential of impacting profitability across the entire meat and dairy chain if the end result of animal welfare initiatives requires the adoption of different farming practices or processing methods.

Early identification of sickness, reduction of farm yard stress, animal behavioral measurement and an ability to monitor the welfare and mitigate adverse conditions, for individual animals, is an important animal welfare and research priority.

Antimicrobial Resistance

Current legislation was introduced in March 2009 in the U.S. House of Representatives to prevent the use of antibiotics. important to human health. from being used non-therapeutically in animals. In North America, a ban on the use of antimicrobials for prophylaxis would result in a further increase in the incidence of clinical disease, decreased performance and increased costs of production. The beef cattle feedlot industry has not explored cost-effective feeding and production alternatives to the use of antimicrobials for disease prevention.

It is likely that in response to animal welfare and consumer demand that pharmaceutical products will be targeted to individuals requiring treatment.

SUMMARY OF THE INVENTION

Wherefore, it is an object of the present invention to overcome the aforementioned problems and drawbacks associated with the prior art. It is further an objective to provide a highly automated, non-confined management system and method which allows continuous or time selected measurement of animal consumption intake and behavior and the determination and monitoring of healthy and sick animals and their performance without disruption of typical animal behavior within their usual environments which includes on farm, in feedlot, in dairy and/or on pasture.

Another objective of the present invention to provide a system which more accurately determines the individual feed intake of animals without errors being introduced by any change in environmental conditions such that the system can be utilized in a greater variety of feeding facilities.

A further objective of the present invention is to more accurately determine the weight of feed within a feed trough at both the beginning and at the end of a consumption event by an animal.

A still further objective of the present invention to provide a system that periodically audits and reports the accuracy of measurement and system performance.

BRIEF DESCRIPTION OF THE DRAWINGS

The invention will now be described, by way of example, with reference to the accompanying drawings in which:

FIG. 2 is a side planar view of a consumption station of the animal identification, measurement, monitoring and management system according to FIG. 1;

FIG. 3 is a front planar view of the consumption station of the animal identification, measurement, monitoring and management system according to FIG. 1.

FIG. 8 is a table of numerical data graphically illustrated in FIG. 7;

FIG. 9 is another table of numerical data graphically illustrated in FIG. 7; and FIG. 10 is yet another table of numerical data graphically illustrated in FIG. 7.

DETAILED DESCRIPTION OF THE INVENTION

Figure 1:
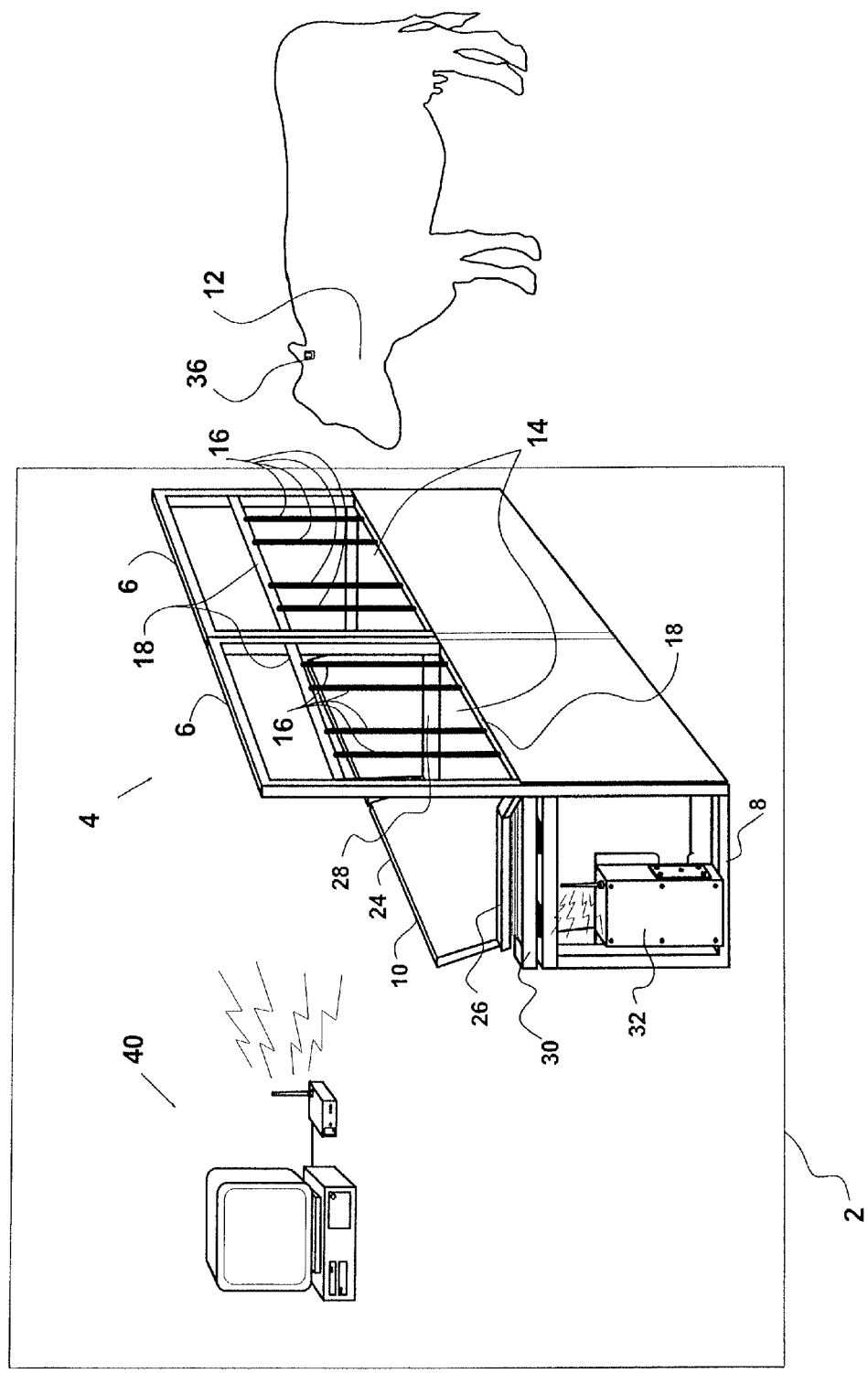
FIG. 1 is a perspective view of the components of the animal identification, measurement, monitoring and management system

Turning now to FIG. 1, a general description concerning the various components of the present invention will now be briefly discussed. The generally comprises a consumption station 4 including a front panel 6 supported by a base frame 8. The front panel 6 is arranged so as to limit access to the feed trough 10 such that only one animal 12, at a time, is able to extend its head through the opening 14 in the front panel 6 and consume feed from the feed trough 10. As generally shown in FIG. 1, the base frame 8 supports the front panels 6 and the feed trough 10 in relation to each other while maintaining the feed trough 10 in such a manner that the weight of the feed trough 10 can be constantly and consistently measured with minimal interference from the animals 12.

As is conventional in the art, the opening 14 in the front panel 6 is defined by a pair of spaced apart vertical neck bars 16 and a pair of spaced apart horizontal neck bars 18 that are both spaced apart from one another by a sufficient distance so as to permit a single animal 12 to extend its head through the opening 14 in the front panel 6 and feed from the respective feed trough 10. Preferably the position(s) of at least one of the horizontal and/or vertical neck bars 16, 18 is adjustable so as to permit alteration of the size of the opening 14 in the front panel 6 through which an animal 12 can insert its head to access and consume feed contained within the feed trough 10. Although the opening 14 should be sized to enable only one animal 12 at a time to access the feed trough 10, the opening 14 should also be large enough to provide the animal 12 sufficient access to generally all of the feed contained within the feed trough 10.

A rear section 20 of the front panel 6 is affixed to the base frame 8, by conventional hardware and in a conventional manner, and the base frame 8 is sized to support a plurality of sequentially arranged feed troughs 10. Each feed trough 10 is generally defined by a front wall 22 and an opposed rear wall 24 and a pair of opposed side walls 26, 28. The feed troughs 10 are supported on the base frame 8 so that the feed troughs 10 are arranged closely adjacent one another, in series, so as permit periodic replenishing of feed within the feed troughs 10 when desired and/or necessary. However, the feed troughs 10 should not contact one another as such contact will interfere with determination of accurate weight measurement of the feed contained within the respective feed trough 10.

The base frame 8 supports a plurality of load cell(s) 30 which directly support each one of the feed troughs 10 and, as is conventional in the art, function as scales. According to the present invention, each one of the respective feed troughs 10 is supported by at least one load cell 30, e.g., each feed trough 10 is supported by a centrally located load cell or by, a pair of opposed load cells 30 or by a load cell 30 supporting each corner of the feed trough 10. Due to this configuration, the entire weight of each one of the feed troughs 10, as well as the feed contained therein, is focused on and completely supported by the respective the load cell(s) 30 for accurately determining the weight of the feed contained within the feed trough 10. As the use of load cell(s) 30, for measuring weight, is generally known in the art, a further detailed discussion concerning the use of load cell(s) 30 will not be provided herein. An important feature of the load cell(s) 30, according to the present invention, is that they should be configured so as to continually monitor and measure the weight of the feed trough 10 and transmit such weight measurements to a local and/or a remote collection apparatus for recordation and analysis, as will be discussed below in further detail. The load cell(s) 30 can be arranged in any manner with respect to the feed trough 10 as long as the weight of the feed trough 10 rests upon the load cell(s) 30 for accurate measurements.

The feed trough 10 is sized to hold a sufficient amount of animal feed, e.g., between 100 and 400 pounds of feed, for example. It is to be appreciated that the amount of feed to be contained within each one of feed troughs 10 is generally not critical as long as there is a sufficient amount of feed to feed an animal 12 during a consumption event. Preferably each feed trough 10 is sized so as to contain enough feed to satisfy the feed requirements of a number of animals 12 consuming the feed for at least a portion of the day.

The base frame 8 also supports a control panel 32 which communicates with each one of the load cell(s) 30, either wirelessly or by conventional cabling (not shown in detail), being supported by the base frame 8. The weight that the feed and the associated feed trough 10 applies to each one of the load cell(s) 30 is measured and transmitted to the control panel 32. A further detailed discussion concerning the collection and subsequent transmission of the measured weights, collected by the control panel 32, will be discussed below.

The control panel 32 is coupled so as to communicate with a variety of radio frequency identification (RFID) equipment which comprise an RFID antenna 34 that is typically embedded, for example, in a rim of the front wall 24 of the feed trough 10 and/or one of the vertical and horizontal bars 16, 18 of the front panel 6. The actual location or placement of the RFID antenna 34, with respect to the associated feed trough 10 and the front panel 6, is generally not critical, as long as the RFID antenna 34 is positioned so as to receive only the unique identification information (code) signal of the animal 12 which extends its head through the opening 14 in the respective front panel 6 in order to consume feed from the associated feed trough 10, and not receive the unique identification information signals from any other animal 12 specifically and animal 12 eating from an adjacent feed trough 10. In a similar manner to the load cell(s) 30, the RFID antenna 34 also communicates with the control panel 32 for providing current information concerning the unique identification information (code) signal of the animal 12 currently feeding at the associated feed trough 10.

To facilitate tracking of each animal 12 to be monitored, each of the animals 12 which has access to any one of the consumption stations 4 carries a RFID transponder 36 and each transponder 36, and thus each animal 12, is provided with a unique identification code. The RFID transponder 36 is located generally on the animal 12 in the vicinity of the neck or head, or in the ear. As a result of such configuration, as an animal 12 approaches one of the consumption stations 4 and accesses a feed trough 10 by extending its head through the one of the openings 14 formed in one of the front panels 6, the RFID transponder 36 is brought into sufficiently close proximity with the RFID antenna 34. Once the RFID transponder 36 is within the detection range of the RFID antenna 34, e.g., within a range of between from 2 to 50 inches for example, the RFID antenna 34 receives the unique identification information (code) signal being transmitted by the respective RFID transponder 36. As noted above, this signal includes a unique code for the RFID transponder number which is associated with the animal 12 currently feeding from the feed trough 10 so that the monitoring system, of the present invention, is able to monitor that consumption event as well as any other event or activity of that animal 12. Once the unique signal is received by the RFID antenna 34, this signal is repeatedly transmitted to the control panel 32 such that each associated consumption event(s) will be associated with that respective animal 12. That is, the time and duration that the animal 12 is at the respective feed trough 10 is determined, with a reasonable level of accuracy e.g., the time that the animal 12 first extends its head through the opening 14 in one of the front panels 6 and commenced feeding from the respective feed trough 10, the time that the animal 12 finally withdraws its head from the opening 14 in one of the front panels 6 and discontinued feeding from the respective feed trough 10 and the entire duration of time that the animal's head was in sufficiently close proximity to the respective feed trough 10, is determined and recorded.

The control panel 32 comprises an electronic signal receiving and transmitting device 38. As discussed briefly above, the control panel 32 is arranged, in a conventional manner, to communicate with each one of the load cell(s) 30 and the associated RFID antenna 34 for each one of the consumption stations 4 so as to receive respective signals from each of those monitoring devices so that the control panel 32 is informed of the respect animal 12 located at each one of the consumption stations 4 as well as the instantaneous weight of the feed contained within the associated feed trough 10. The control panel 32 generally further includes a data storage unit (not separately labeled) for temporarily recording and storing the measured and collected weight and unique identification information (code) signals from the load cell(s) 30 and the RFID antenna 34 as well as the corresponding time that this information is collected. It is also possible that the control panel 32, may not have any separate data storage unit other than perhaps an internal memory. In this case, the control panel 32 merely collects and then retransmits all of the collected weight, unique identification information (code) and time information, collected from the load cell(s) 30 and the associated RFID antenna 34, to a remote central processing computer 40 via a conventional transmitting mechanism by wireless transmission or via conventional cabling (not shown). If the control panel 32 includes a storage unit (not separately labeled), the collected weight and unique identification information (code), from the load cell(s) 30 and the RFID antenna 34, are temporarily stored for a desired period of time, e.g., for a few minutes up to possibly a day or so, but this information is eventually transmitted to the central processing computer 40 at some later desired point in time. For example, the storage unit may collect data for a period of 24 hours and thereafter transmit all of the collected data to the central processing computer 40 at a selected time, e.g., at 12:00 a.m. each night for processing and analysis by the processing computer 40. Alternatively, the storage unit may collect data for a shorter duration of time, e.g., 2-8 hours, for example, and thereafter periodically transmit all of the collected data to the central processing computer 40 at multiple times during the day.

The basic data which is collected and recorded and processed by the central processing computer 40 includes the total weight of the trough, including the feed contained therein, as well as the unique identification information (code) of an RFID transponder 36 which is in close proximity to the respective front panel 6 associated with the feed trough 10 and the current time. As the processing computer 40 receives these determined and transmitted information, this information is then stored in a suitable memory device along with the associated time stamp information correlating the precise time when this information was collected. According to a preferred form of the present invention, the system 2 collects and records the measured weight information as well as unique identification information (code) of an RFID transponder 36 which is in close proximity to the respective front panel 6 associated with the feed trough 10 once each second of the day so that 86,400 weight measurements are collected for each one of the feed troughs 10 each day. It is to be appreciated that, depending upon a variety of factors, it is possible that more or less data may be collected each day with respect to each one of the feed troughs 10.

By measuring the weight of the feed trough every second or so over a period of 24 hours and storing all of this collected data in the main storage device of the system 2, it is possible to analyze the weight data at a later point in time and more accurately calculate changes in the weight of the feed contained within the feed trough 10 as discussed below in further detail. One advantage of the methodology discussed herein is that the system 2 is not limited in determining the weight at a given point in time but by the historical and future data (limited by the future time we chose to calculate this data).

By coupling or arranging a plurality of consumption stations 4 together side-by-side in series with one another as generally shown in FIG. 1, a number of animals 12 are able to consume feed at the same time. This is beneficial for a number of obvious reasons. For instance, when feeding a number of animals 12 from a single or a small number of consumption stations 4, the more dominant animals 12 within the group have a tendency to preclude one or more of the less dominant animals 12 from feeding in a desired manner. Thus the number and duration of consumption events of an animal 12 can be affected by the number of consumption stations. The actual number of consumption stations 4 utilized by the production facility obviously depends on the number of animals 12 to be contained within a containment area, i.e., the overall size of the fenced in confined area as well as the number of animals 12 comprising the heard.

Regardless of the number of the consumption stations 4 utilized by the production facility, it is must be recognized that each one of the consumption stations 4 comprises a completely separate feed trough 10 supported by either a separate load cell 30 or a separate set of load cell(s) 30 which is/are completely separate and independent from the load cell(s) 30 utilized by any of the other consumption stations 4. In addition, the front panel 6 has corresponding RFID antenna 34 which are also separate and independent from the other RFID antennas 34 being utilized by any adjacent consumption station 4 so that the system 2 can precisely identify which animal 12 is feeding from which one of the feed troughs 10 at any given point in time. Regardless of the mechanism employed for collecting and recording the unique identification information (code) of an RFID transponder 36, the feed trough weight information and the current time, it is critical to correlate the unique identification information (code) with the current weight data being measured and collected from the specific set of load cell(s) 30 as well as the precise time that both sets of data or information are being collected and recorded by the system 2.

Figure 4:
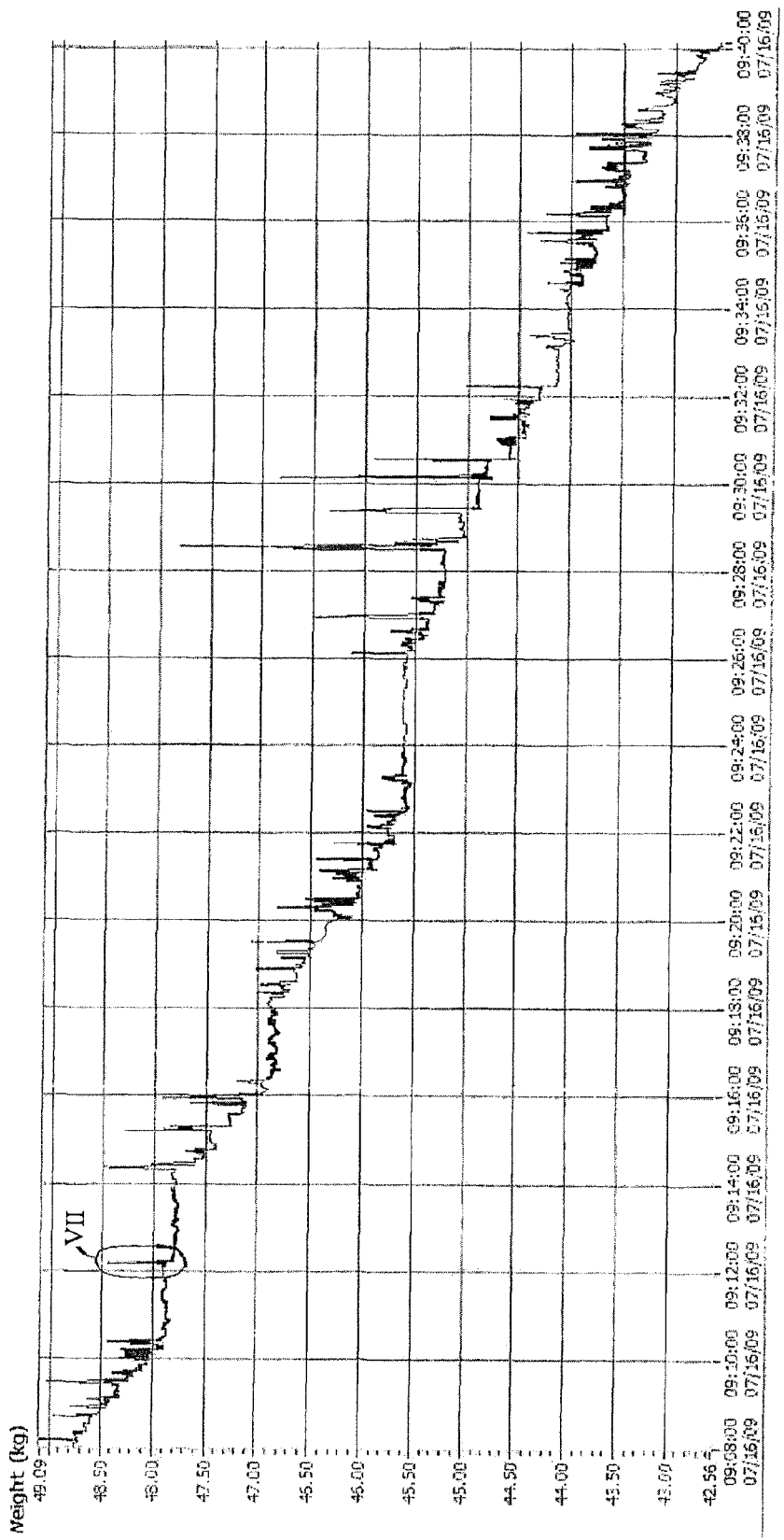
FIG. 4 is graphical illustration of measured weight data collected over a period of time and includes noise caused by a variety of factors.
Figure 5:
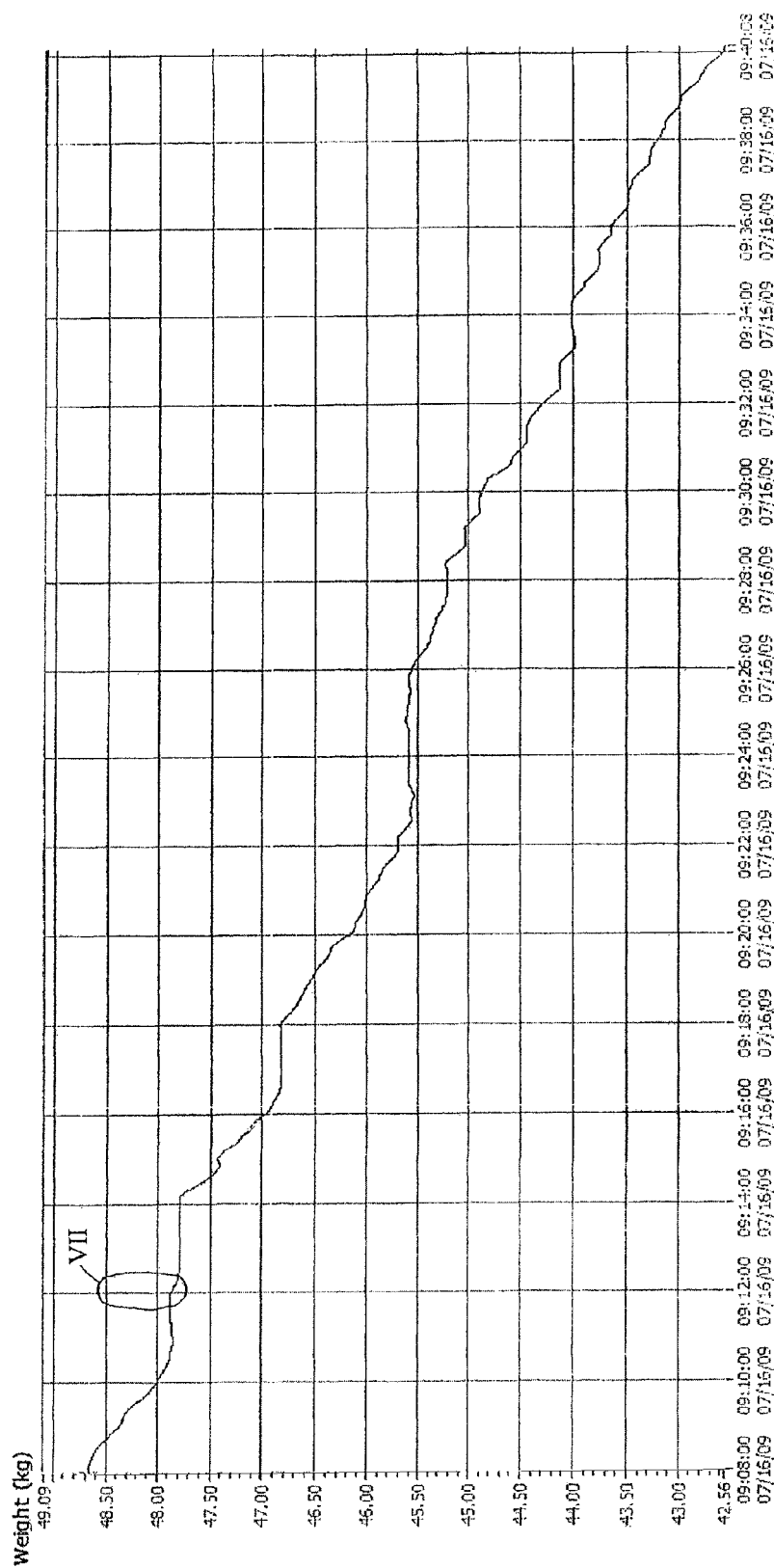
FIG. 5 is graphical illustration of filtered weight data determined from the measured weight data utilizing the inventive method.

As mentioned above, the collected and recorded data is generally analyzed at some later point in time, e.g., at night or some other convenient time. According to the present invention, analyzing the data can include the use of a weight filtering technique. FIGS. 4. and 5 show a sample of the weight data as recorded over the course of about a ½ hour period of time. FIG. 4 shows the collected and recorded data (pre-processed data) including the measured weight and the time at which the measured weight was collected and recorded. While FIG. 4 shows the collected and recorded data (pre-processed data) before any filtering technique is applied, FIG. 5 shows the collected and recorded data (refined or filtered data) after the filtering technique is applied. As shown in FIG. 4, the pre-processed data includes a number of sharp spikes, each of which represent either a sharp increase or a sharp decrease in the measured weight of the feed trough 10 at a some point in time. Such sharp spikes can result from, for example, an animal 12 forcing its snout, nose and/or mouth into the feed contained within the feed trough 10. This force temporarily increases the measured weight of the feed and respective feed trough 10 that is detected by the respective load cell(s) 30. Further erroneous weight measurements may be introduced when feeding the animal 12 hay which has not been chopped up or otherwise processed. In this situation, the pressure of the snout in the feed is substantially different from when an animal 12 is consuming steam flaked corn, for example. Hay creates a "feeding weight profile" of very little pressure over very long durations as the animal 12 typically does not take its head out of the feed trough 10 while chewing and consuming the hay. In comparison steam flaked corn has a "feeding weight profile" with distinct bites of a short duration. The collected and recorded data (pre-processed data) may also be negatively influenced depending on the direction of pressure. In the case of hay, the animal 12 is able to exert a negative pressure on the feed trough 10 as the animal 12 bites and lifts a mouthful of hay from the trough 10 since the hay intertwines with itself. So from the collected and recorded data (pre-processed data) (FIG. 4), it is readily apparent that an inaccurate feed trough measurement or measured weight can be detected if the measurement is obtained when this additional force is being applied to the feed trough 10. If the system 2 were to utilize the pre-processed data such as the measured weight of the feed contained within one of the feed troughs 10 at the start of a consumption event—which is typical in the prior art systems—then an inaccurate initial measured weight can be utilized in determining the amount of feed being consumed by an animal 12 during a consumption event. For example, the measured weight of the feed trough 10 recorded at the beginning of a consumption event could correspond to a peak of one of the many spikes shown in FIG. 4. It is to be appreciated that the large spikes, illustrated in FIG. 4, may represent as much as a 2.5 kg change in the measured weight of the feed contained within one of the associated feed troughs 10 over the course of less than a minute for example (see FIG. 4 at approximately 09:28:30). Clearly, such a large change in measured weight over such a short time span is not possible. However, the prior art systems could possibly detect and utilize the erroneous information of one such spike as an initial measured weight of feed or as an ending measured weight of feed. This would lead to highly inaccurate and/or unrealistic feed consumption rates and is believed to be quite prevalent with the use of currently known management systems. It is possible to conclude, utilizing the known methods of calculating, changes in the measured weight of the feed trough 10 that, during a single consumption event, an animal 12 has consumed 2.5 kg of feed over the time span of only a few minutes or so, which is highly improbable and unrealistic. It is also conceivable to determine that an animal 12, during a consumption event, has added feed to the feed trough 10, which is also highly unlikely. These noted inaccuracies in determining the changes in the measured weight of the feed contained within the feed trough 10, according to the prior art systems, are overcome in the present invention and discussed below in further detail FIG. 5 shows the same measured weight to time regression as that of FIG. 4, however, the weight data for this regression is more accurately depicted by utilizing the inventive method according to the present invention. It is obvious to see that the above described spikes or inaccuracies associated with the pre-processed data, for the collected and recorded measured weights, are removed such that it is possible to more accurately calculate differences in the weight of the feed trough 10 over a desired period of time and thus to more accurately calculate the amount of feed actually being consumed by an animal 12 during a consumption event.

The weight filter of the present invention utilizes statistics, such as regression and averaging, to calculate weights and/or the resolution of the measurements that are dramatically more accurate than the those achieved by any of the known techniques which typically include "a noise floor" (a noise floor is generally created by weight changes caused by environmental conditions).

With the inventive method, at specified time intervals, the collected and recorded measured weights are filtered with a weighted filter to create accurate starting and ending weights for use in determining feed consumption during each recorded consumption event. That is, a consumption event is typically considered to coincide with the amount of time that a specific animal 12 is present at the respective feed trough 10 as determined by the reception of RFID signals containing the animal's unique identification information (code). The weight filter comprises of a duration factor (a specified amount of time before and after an actual time which the processing computer 40 utilizes in determining an accurate weight) and a mathematical methodology to describe the most accurate weight that is representative for that duration of time, based on the pre-processed data subset.

Typical known methods of enhancing the accuracy of measured weight data while weight measurements are being collected and recorded is accomplished by averaging multiple samples (measured weights over a duration of time). One of the problems encountered while averaging the measured weight of a feed trough 10 is that an animal generally applies a significant force to the feed while taking a bite, as discussed above. These inaccurate measurements are included when calculating the average measured weight and as such the calculated measured weight of the feed is significantly skewed.

There are several mathematical methodologies that can be utilized to eradicate this error. The weighted filter of the invention utilizes a practical and simple way of eliminating inaccurate measured weights which includes the use of numerous weight measurements. Each set of these measured weights are sorted and arranged from a lowest weight value to a highest weight value in a respective array and then from each array, a specific index is utilized to determine the appropriate filtered measured weight. Other preferred embodiments of the weight filter may utilize the process of collecting, sorting and arranging the arrays as described above and then selecting a subset from that array and finally specifying a specific position within the data subset. The measured weight value in that specified position will be the appropriate filtered measured weight. Another preferred embodiment of the weighted filter includes the process of collecting, sorting and arranging the arrays as described above, and then eliminating a number of measured weight values in the array and next averaging the remainder of the measured weight values, with the average measured weight value being the appropriate filtered measured weight. Yet another preferred embodiment of the weighted filter includes the process of collecting, sorting and arranging the arrays as described above, and then establishing a mean of the measured weight values in the array and next eliminating all the measured weight values that are outside a chosen standard deviation from the mean, after which the remaining array of measured weight values is averaged. Another preferred embodiment of the weighted filter includes the process of collecting, sorting and arranging the arrays as described above, and then sorting and regressing the array subset and then using a specified index of the array to specify the appropriate filtered measured weight.

Figure 7:
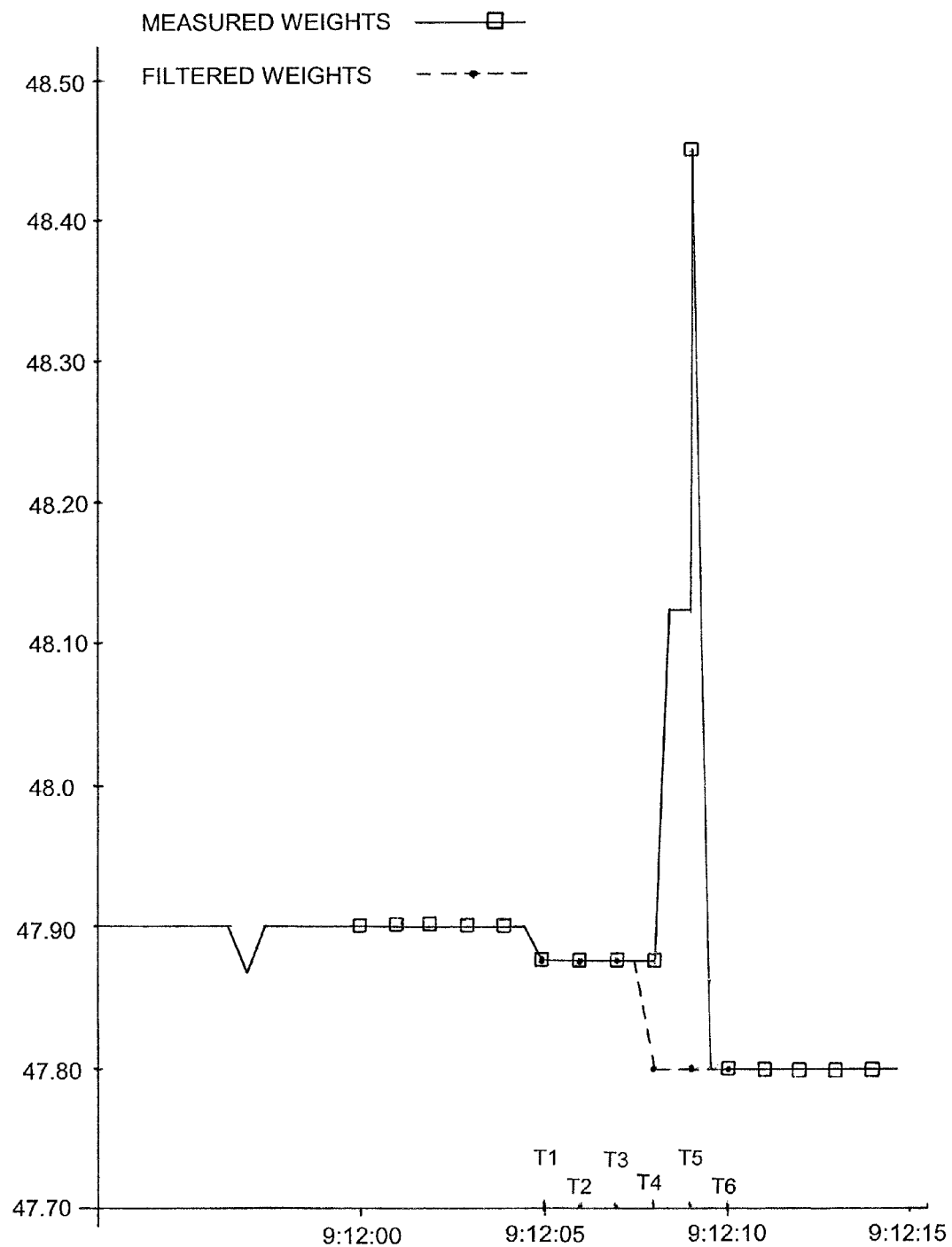
FIG. 7 is a detailed graphical illustration of encircled portions VII of the graphical illustrations according to FIGS. 5 and 6.

To illustrate a preferred manner of processing measured weight data, FIG. 7 shows a graphical illustration of measured weight over about a 15-20 second time period as encircled in FIGS. 4 and 5 and labeled VII. Although, the weight of the feed trough 10 is measured continually, to streamline filtering of the pre-processed data (measured weights MW), the measured weights MW can be collected and recorded at specific intervals of time instead of on a continual basis as discussed above. For example, the measured weights MW can be recorded every $\frac{1}{10}$ of a second, $\frac{1}{2}$ second or, as in the following illustrated example, once every second. In this example illustrated in FIG. 7, the measured weights MW, such as those graphically illustrated in FIG. 4, are represented by squares that are connected by a solid line. As can be seen in FIG. 7 the graph of the measured weights MW includes a large spike approximately at time point T5 (9:12:09). This spike represents an increase of about 0.6 kg in the weight of the feed which lasts for less than 2 seconds.

The accurate filtered weights FW (appropriate filtered measured weight) as processed in this exemplary embodiment, such as those graphically illustrated in FIG. 5, are represented by solid black dots that are connected by a dashed line. As seen in FIGS. 5 and 7, by processing the measured weights MW in the manner described herein, the unreasonable, inaccurate measured weights MW like the measured weight MW at time point T5 (9:12:09) in FIGS. 4 and 7, which typically introduce significant errors in the methods of the prior art, can be eliminated. FIGS. 8, 9 and 10 include the numerical data represented in FIG. 7. The first column (Time) in the FIGS. 8, 9 and 10 represents the times at which the measured weights MW were recorded and stored and includes the time points (T1-T6) at which the weight of the feed trough 10 in kilograms kg was measured and recorded. The time span as illustrated in this example, extends from about 9:12:00 to about 9:12:15, thus representing the measured weights MW of the feed trough 10 as recorded every second over a 15 second time span. The second column (Measured Weight MW) in FIGS. 8, 9 and 10 lists the measured weights MW as recorded over the 15 second time interval. The next six columns in each of the FIGS. 8, 9 and 10 merely help demonstrate one process for filtering measured weights MW and determining accurate filtered weights FW and should only be regarded as an example of such a process.

In this example, to determine the accurate filtered weight FW at a time point T1 (9:12:05), a set of 11 measured weights MW is collected. This set is shown in the third column of FIG. 8 and includes the measured weights MW that were recorded starting 5 seconds before the time point T1 to 5 seconds after the time point T1 or, in other words, this set includes the measured weights MW that were recorded over the time span from 9:12:00 to 9:12:10. The third column of FIG. 8 lists the set of measured weights MW that will be considered in the process for determining the accurate filtered weight FW at time point T1. Next, the set of 11 measured weights MW is arranged in order from the lowest measured weight MW value to the highest measured weight MW value and listed in the fourth column of FIG. 8. Finally, the $4^{th}$ lowest measured weight MW value of the ordered set of measured weight MW values is chosen as the accurate filtered weight FW. Thus the accurate filtered weight FW for time point T1 (9:12:05) is equal to 47.875 kg and is shown in the fifth column of FIG. 8.

To determine the accurate filtered weight FW at a time point T2 (9:12:06), another set of 11 measured weights MW is collected. This set includes the measured weights MW that were recorded starting 5 seconds before the time point T2 to 5 seconds after the time point T2 or, in other words, this set includes the measured weights MW that were recorded from 9:12:01 to 9:12:11. The set of measured weights MW considered for determining the accurate filtered weight FW at time point T2 are listed in the sixth column of FIG. 8. Next, the set of 11 measured weights MW is arranged from the lowest measured weight MW value to the highest measured weight MW value and listed in the seventh column of FIG. 8. Finally, the $4^{th}$ lowest measured weight MW value of the ordered set of measured weight MW values is chosen as the accurate filtered weight FW. Thus the accurate filtered weight FW for time point T2 (9:12:06) is equal to 47.875 kg and is shown in the eighth column of FIG. 8.

In the manner as described above with regard to time points T1 and T2, to determine the accurate filtered weight FW at a time point T3 (9:12:07), a set of 11 measured weights MW was again collected. This set includes the measured weights MW that were recorded starting 5 seconds before the time point T3 to 5 seconds after the time point T3 or, in other words, this set includes the measured weights MW that were recorded from 9:12:02 to 9:12:12. The set of measured weights MW considered for determining the accurate filtered weight FW at time point T3 are listed in the third column of FIG. 9. Next, the set of 11 measured weights MW is arranged from the lowest measured weight MW value to the highest measured weight MW value and listed in the fourth column of FIG. 9. Finally, the $4^{th}$ lowest measured weight MW value of the ordered set of measured weight MW values is chosen as the accurate filtered weight FW. Thus the accurate filtered weight FW for time point T3 (9:12:07) is equal to 47.875 kg and is shown in the fifth column of FIG. 9.

To determine the accurate filtered weight FW at a time point T4 (9:12:08), a set of 11 measured weights MW is again collected. This set includes the measured weights MW that were recorded starting 5 seconds before the time point T4 to 5 seconds after the time point T4 or, in other words, this set includes the measured weights MW that were recorded from 9:12:03 to 9:12:13. The set of measured weights MW considered for determining the accurate filtered weight FW at time point T4 are listed in the sixth column of FIG. 9. Next, the set of 11 measured weights MW is arranged from the lowest measured weight MW value to the highest measured weight MW value and listed in the seventh column of FIG. 9. Finally, the $4^{th}$ lowest measured weight MW value of the ordered set of measured weight MW values is chosen as the accurate filtered weight FW. Thus the accurate filtered weight FW for time point T4 (9:12:08) is equal to 47.80 kg and is listed in the eighth column of FIG. 9.

The accurate filtered weights FW at time points T5 and T6 are determined in the manner as described above with regard to the time points T1, T2, T3, T4 and for the sake of brevity, the same will not be discussed further. However, the sets of measured weights MW, the ordered list of measured weight MW values from low to high and the corresponding accurate filtered weights FW can be seen in the columns of FIG. 10. To summarize, the accurate filtered weight FW for time point T5 (9:12:09) is equal to 47.80 kg and likewise the accurate filtered weight FW for time point T6 (9:12:10) is equal to 47.80 kg.

The accurate filtered weights FW from each of the time points T1-T6 are graphically illustrated in FIG. 7 by the solid black dots and are connected by a dashed line. As indicated above, FIG. 5 is a graphical illustration of the accurate filtered weights FW over an approximate 30 minute time period. By filtering the measured weights MW and determining and plotting the accurate filtered weights FW, the trough weights can be clearly illustrated without the inaccuracies often associated with such data in the known methods.

Other mathematical formulas including regressions, minimums, maximums, standard deviations plus the minimum can also be used to obtain the most accurate weighted filter.

As discussed above, the basic purpose of the weighted filter is to filter out or remove abnormal inaccurate weight measurements, such as measurement recorded at a time when a force is being applied to the feed trough 10 such as when the animal 12 pushes its snout into the feed in order to consume feed. The type of feed being consumed (e.g., hay, silage, water or minerals, for example) and the environmental conditions (e.g. wind, rain or humidity, for example) can also have an influence on which weight filter will be most appropriate and function best.

The methodology used to determine which weight filter to use with the method is an iterative process which applies a number of different weighted filters and compares the outcomes of these weighted filters against the sum of all the feeding events and the total amount of feed supplied, for a preset time interval, as well as the amount of feed "appearing" or "disappearing" when no transponder 36 is being read (the in-between feeding interval information). The accuracy for selecting the best suitable weight filter is also dependent on the speed of the processing computer 40, the time interval (typically a 24 hour time period) and the amount of time available for the processing computer 40 to perform desired calculations.

A number of factors must be considered when selecting which weight filter to use with the method. A few of these are the desired accuracy of the determined weight measurement and the allowable length of time to calculate the determined weight measurement. For example, increasing the duration of time from which the sample is derived provides a more accurate filtered weight measurement however, this also increases the amount of time taken by the computer to calculate the final weight measurement. That is, it reduces the responsiveness of the weighing device. On the other hand, decreasing the time frame from which the sample is derived provides a less accurate filtered weight measurement, however this also decreases the amount of time taken to calculate the accurate filtered weight measurement. That is it, reduces the ability to minimize error introducing factors such as influences from the animal and/or wind.

The typical field in which the RFID transponder 36 can be read is diagrammatically shown in FIG. 2 as a shaded area or region 42 and is typically known as the transponder read area. Since the transponder read area may possibly also extend to an adjacent feed trough(s) 10, there is the possibility that the RFID transponder 36 of one animal 12 can be intentionally read by the RFID antenna 34 associated with the adjacent feed trough 10 in addition to being read by the RFID antenna 34 of the feed trough 10 from which the animal 12 is consuming feed. However, this typically does not occur when there is an animal 12 consuming feed from the adjacent trough since the RFID transponder 36 from the animal 12 which is consuming feed will "drown out" the RFID transponder 36 signal from the animal 12 at the adjacent feed trough 10 because the remote signal(s) are generally weaker.

To greatly reduce, if not eliminate, the occurrence of such incorrect detection, the system 2 of the invention utilizes a specified time frame (typically a period of time when the transponder 36 was read on a fairly consistent basis) and the mode location of the consumption event for all the RFID observations.

Since RFID transponders 36 are typically position sensitive, such that the read range can be dramatically reduced, if the RFID transponder 36 is located in a least favorable position, it might take more than a few seconds before the RFID tag or signal is actually read by the system 2. Occasionally, the first measured weight data collected and recorded by the control panel 32 coincides with the animal 12 placing its snout in the feed and applying force onto the load cell(s) 30 supporting the associated feed trough 10. Therefore, using the measured weight collected by the system 2 at the point in time when the RFID transponder 36 is actually read as a starting weight for the consumption event can, in some instances, severely compromise the data. In order to reduce the effect of such occurrence(s), the method of the present invention uses the accurate filtered weight FW which was that was determined by the weight filter, at a time point between the last recording of a previous animal 12 and the first RFID signal recording of the new animal 12 as the finishing weight for the previous animal 12 and the starting weight for the new animal 12 which may be used to calculate the amount of feed consumed by the animals 12

However, one possible disadvantage concerning this methodology is that the possible disappearance of any feed (such as feed being consumed by possibly birds or rodents) from the feed trough 10, between the time that the previous animal 12 left the feed trough 10 and the time when a new animal 12 arrived at the feed trough 10 should be accounted for in some manner. Assuming that the error is relative small, the present invention proposes using the accurate filtered weight FW, as calculated by the filtering technique previously described, at a time point that is half way between the last RFID recording of the previous animal 12 and the first RFID recording of the new animal 12. However, it is to be appreciated that the use of this method is not with out problems since it is possible that one or more animals 12, within the pen, either has lost its RFID transponder 36 or has an RFID transponder 36 that is defective or not properly operating.

To compensate for this potential problem, the system 2 according to the invention calculates a weight difference between the accurate filtered weight FW of the feed trough 10, including the feed, at the exact time point when the previous animal 12 left the respective feed trough 10 and the accurate filtered weight FW of the feed trough 10, including the feed, at the exact time point when the new animal 12 arrived at the feed trough 10. If this weight difference exceeds a certain threshold, the system 2 will assume that the missing feed was consumed by a rodent(s), a bird(s) and/or an animal(s) with a lost or malfunctioning RFID transponder 36 and thus use both of those accurate filtered weights FW as the subsequent beginning and end weights of the respective consumption event. The threshold amounts of the weight difference preferably range from between about 250 to about 750 grams, more preferably between about 400 to about 600 grams and most preferably is 500 grams.

Figure 6:
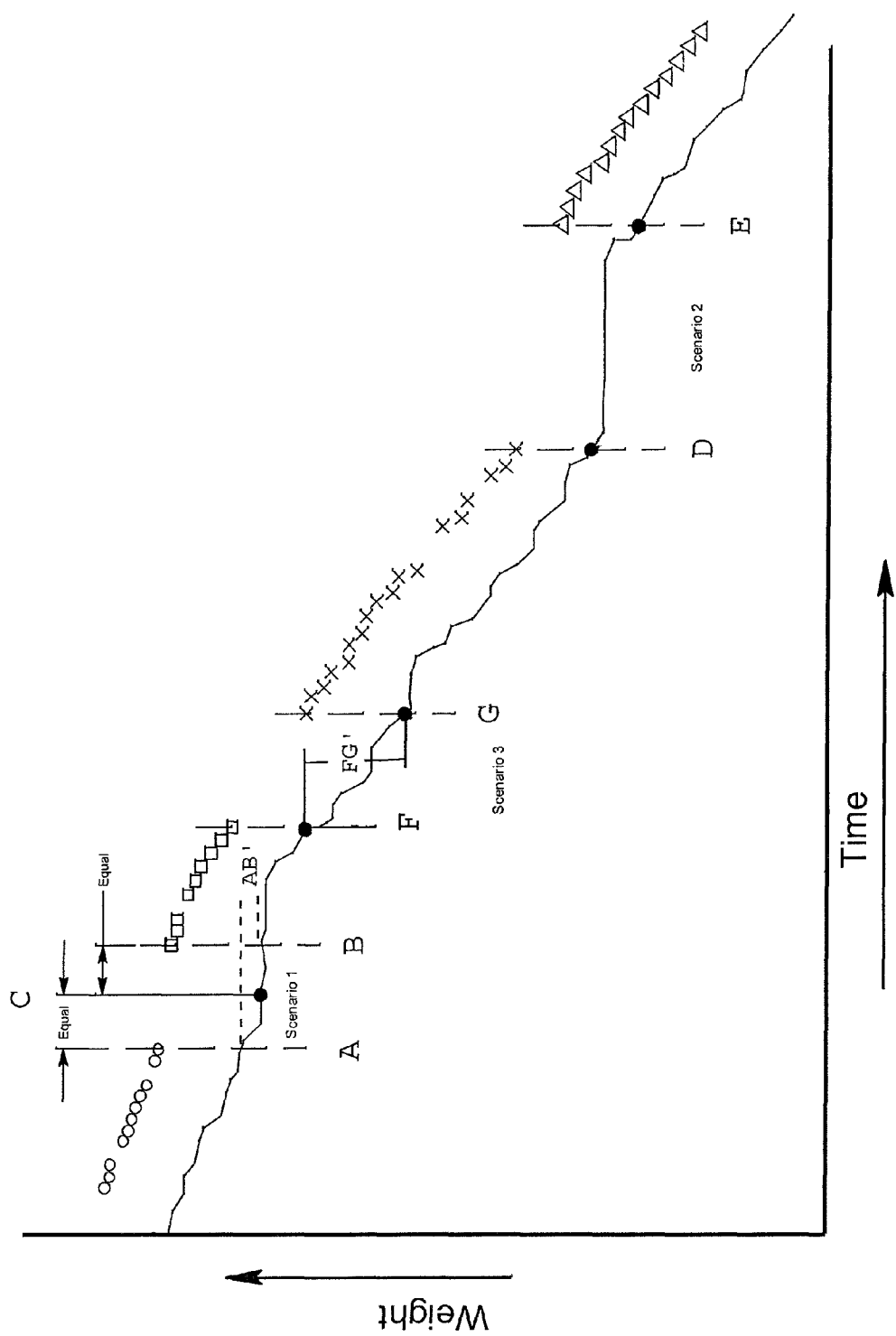
FIG. 6 is a graphical illustration of the consumption events of four different animals and the corresponding filtered weight data determined from the measured weight data utilizing the inventive method.

In determining accurate beginning and ending weights for a consumption event, the system 2 executes a verification and auditing procedure. This procedure accounts for feed that is either "removed from" or possibly "supplied to" the trough between recorded consumption events. The disappearance from or appearance of any feed in the feed trough 10 is recognized by changes in the accurate filtered weight FW of the feed trough 10, including the feed, while no animal 12 is detected as being present at and feeding from the feed trough 10. As previously discussed, these weight changes can be cause by any numbers of factors such as changes in environmental conditions, like wind, humidity or consumption of feed by a rodent(s), a bird(s) and/or an animal(s) with a lost or malfunctioning RFID transponder 36. Unlike data inaccuracies introduced when the animal 12 places their snout into the feed and typically graphically seen as sharp spikes in the regressions of the measured weights, such as those discussed above and seen in FIG. 4, the weight changes caused by factors such as changes in environmental conditions can be seen in the graphical illustration of the filtered data, as decreases in the weight of the feed between consumption events (FIG. 6).

The verification and auditing procedure includes consideration of accounted feed disappearance which is the inverse ratio between the sum of all unaccounted feed disappearance divided by all the accounted feed disappearance expressed as a percentage. The present invention sums all the unaccounted feed disappearance (the feed disappearance which was over a certain weight value between the previous animal 12 exiting or leaving the feed trough 10 and the appearance of the new animal 12 at the feed trough 10) and divides this sum by a sum of accounted feed disappearance of all of the consumption events. This number is expressed as a percentage and recorded as unaccounted feed disappearance.

Further consideration in the verification and auditing procedure is given to the accounted feed supply, that is the inverse ratio between the sum of all unaccounted feed appearance divided by all the accounted feed disappearance, also expressed as a percentage.

Giving consideration to ad lib feeding and bunk management, the system 2 records the length of time that the trough 10 was empty during the day, and how much feed was left over in the trough 10 every day.

In order to confirm whether or not the inventive system 2 is properly operating throughout the day, an auditing routine calculates the ratio of the number of weight measurements collected and recorded over a give period of time divided by the number of weight measurements which should have been collected and recorded over that same give period of time. For example, if weight measurements were collected and recorded once every second, this would result in total of 86,400 measurement being collected and recorded over the course of a 24 four period of time. Thus, the result of this calculation for a properly working system 2 is 1, e.g., 86,400 weight measurements/86,400 weight measurements, and a result of less than 1 would indicated an improperly working system 2.

The system 2, according to the present invention, is capable of determining if too much feed was placed into the trough 10. Excess feed placed in the trough 10 can spill onto the ground, or can be consumed by animals without the animals 12 placing their heads through the opening 14. According to this determination, the system 2 records a percentage of the day that the trough was oversupplied with feed by summing the amount of time that the trough weight was over a certain limit. This limit is variable, depending on the type of feed placed in the trough 12 and is determining by considering the specific gravity of the feed and the size or capacity of the feed trough 10.

It is possible to confirm that RFID transponders 36 are being correctly read by the system 2. To verify that RFID transponders 36 are being read properly, the system 2 calculates the ratio of RFID reading collected and recorded per consumption event for every feed trough 10. A consumption event can be determined by the passage of a certain amount of time from a previous consumption event without the presence of any animal 12 at the feed trough 10. Typically, if animals 12 are absent from the feed trough 10 for a period of time typically in the range of 500 seconds to 100 seconds or approximately 300 seconds, one could determine that a consumption event has ended.

FIG. 6 shows a graphical illustration of the weight of the feed trough, including the weight of the feed, as determined with the mathematical weighted filter technique over a period of time as described above. Four different symbols (i.e., circles, squares, crosses and triangles) are depicted in this figure and each symbol represents a distinct animal 12, as identified by the animal's unique RFID transponder 36. Each grouping of the different symbols, over a period of time, is indicative of the length of time that the animal 12 was feeding at the respective feed trough 10 or, in other words, represents the duration of the consumption event for that specific animal 12. For example, the time period from time point B to F represents a consumption of one animal 12 (identified by squares) and the time period from time point G to D represents a consumption of the next animal 12 (identified by crosses). The graph of FIG. 6 illustrates four different consumption events of varying durations of time. As would be expected, the weight of the feed trough 10, specifically the feed contained within the feed trough 10, markedly decreases during each one of the four consumption events.

Between each one of the consumption events is a duration of time where the system 2 does not detect any animal 12 as feeding at the respective feed trough 10 (no unique identification information (code) is being read) and, therefore, no feed is presumably being consumed during such time period. Because of the absence of animals 12 during these periods of time, one would normally expect the weight of the feed trough 10 to be substantially constant. However, as shown in FIG. 6, the weight measurements can vary somewhat due to the fact that the unique identification information (code) of a RFID transponder 36 might not be immediately read because the position of the RFID transponder 36 was not favorable for transmitting the unique identification information (code) to the RFID antenna 34. As previously noted, there are a number of reasons that the measured weight of the feed within a feed trough 10 can change even though the amount of feed contained within the trough 10 actually remains the same. As briefly discussed above, when the feed and/or feed trough 10 are exposed or subjected to changes in environment conditions, e.g., it is common for these changes in the weather or environmental conditions to alter the measured or the actual weight of the feed contained within the feed trough 10. For example, if the feed was relatively dry, when initially loaded into the feed trough 10 and the relative humidity for the surrounding environment was relatively low, if the relative humidity in the area of the trough 10 gradually increases over the course of the day, it is quite possible for the actual weight of the feed, contained within the feed troughs 10, to gradually increase as the normally dry feed absorbs moisture. In addition, if precipitation were to fall into the trough over the course of the day, the weight of the feed contained within the feed trough 10 would also appear to increase. Moreover, the inventors have observed that exposure of the feed trough 10 to wind, for example, can affect the weight of the feed trough 10. Wind has been observed to alter the determined weight of the feed trough 10 by up to 1 lb or so, for example. As a result, the wind can easily cause the weight of the feed trough 10, including the feed, to either increase or decrease depending upon the velocity of the wind and/or the direction of wind acting upon the feed trough 10 being measured.

Given the possibility of changes in the measured weight of the feed trough 10 occurring between consumption events, the inventive method for accurately measuring the weight of feed consumed during a consumption event also includes a procedure for compensating for such environmental effects. This procedure is discussed below in relation to three different scenarios between four consumption events as illustrated in FIG. 6. Exemplary time points and weights are utilized below to help further illustrate the three scenarios. It should be understood that the time points and weights are purely for illustrative purposes only and do not represent actual time points or weights.

Scenario 1 illustrates a weight change between a first consumption event as indicated by the presence of a first animal 12 (designated by the circles) and a second consumption event as indicated by the presence of a second animal 12 (designated by the squares). The time difference between the first and second consumption events, that is the time span between time point A (the last detected reading of the RFID transponder 36 of the first animal 12) and time point B (the first detected reading of the RFID transponder 36 of the second animal 12) is identified as the time difference AB. The difference in the weight of the feed trough 10 at time point A and at time point B is identified as the weight difference AB'. In this scenario, the time difference AB is said to be smaller than a set time limit value X, which could be in the range of 2400 seconds to 1200 seconds or could preferably be approximately 1800 seconds, for example, and the weight difference AB' is said to be smaller than a set weight limit value Y which could be in the range of 1000 grams to 100 grams or could preferably be approximately 500 grams. As such, the selected weight that is to be considered in calculating the weight of feed consumed in the first and second consumption events or in other words the weight selected as the end weight of the first consumption event and the weight selected as the start weight of the second consumption event is the weight of the trough at time point C which is the time point that is half of the time difference AB.

In order to help further illustrate the above, the first consumption event will be considered to have ended at 12:00:00 (time point A) and the second consumption event will be considered to have started at 12:02:00 (time point B), thus the time difference AB in this example is 120 seconds. In accordance with Scenario 1, because the time difference AB and the weight difference AB' are each smaller than the respective set time and weight limit value, the weight selected as the end weight of the first consumption event and the start weight of the second consumption event is the weight at 12:01:00 (time point C).

Scenario 2 illustrates a weight change between a third consumption event as indicated by the presence of a third animal 12 (designated by the crosses) and a fourth consumption event as indicated by the presence of a fourth animal 12 (designated by the triangles). The time difference between the third and fourth consumption events, that is the time span between time point D (the last detected reading of the RFID transponder 36 of the third animal 12) and time point E (the first detected reading of the RFID transponder 36 of the fourth animal 12) is identified as the time difference DE. In this scenario, the time difference DE is greater than a set time limit value X, which could be 1800 seconds, for example. Due to the extended period of time between the third and the fourth consumption events there is an increased likelihood that, because of changes in environmental conditions such as a relatively significant temperature change or change in the level of humidity, the feed has either dried or absorbed moisture, which may have a measurable influence on the weight of the feed detected by the instrumentation. In view of this possibility, the selected ending weight that is to be considered in calculating the weight of feed consumed during the third consumption event is the weight at the time of the last RFID reading of the third animal 12, i.e., at time point D. The selected beginning weight that is to be considered in calculating the weight of feed consumed during the fourth consumption event is the weight at the time of the first RFID reading for the fourth animal 12, i.e., at time point E. Any weight difference between these two time points D, E is referred to above as an "unaccounted feed disappearance".

In order to help further illustrate Scenario 2, the third consumption event will be considered to have ended at 12:30:00 (time point D) and the weight of feed at that time is considered as being 4700 g. The fourth consumption event will be considered to have started at 1:05:00 (time point E) and the weight of feed at that time is considered as being 4500 g, thus the time difference DE is 2100 seconds. In accordance with Scenario 2, because the time difference DE is greater than the set time limit X, the weight selected as the end weight of the third consumption event is the weight of feed at 12:30:00 (time point D) which is 4700 g. The weight selected as the start weight of the fourth consumption event is the weight of feed at 1:05:00 (time point E) which is 4500 g. Further, in this example, there would be an unaccounted feed disappearance of 200 g.

Scenario 3 illustrates a weight change between the second consumption event as indicated by the presence of the second animal 12 (designated by squares) and a third consumption event as indicated by the presence of the third animal 12 (designated by crosses). The time difference between the second and the third consumption events, that is the time span between time point F (which is the last detected reading of the RFID transponder 36 of the second animal 12) and time point G (which is the first detected reading of the RFID transponder 36 of the third animal 12) is identified as the time difference FG. The difference in weight of the feed trough 10 between time point F and time point G, is the weight difference FG'. In this scenario, the time difference FG is smaller than a set time limit value X, which could be 1800 seconds, for example, however the weight difference FG' is greater than a set weight limit value Y which could be 500 grams, for example. The large difference in the weight of the feed FG' between the second and third consumption events is indicative of an amount of feed that has been consumed by one or more rodent(s), bird(s) and/or animal(s) 12 with a lost or malfunctioning RFID transponder 36. In this scenario, the selected ending weight that is to be considered in calculating the weight of feed consumed during the second consumption event is the weight at the time of the last RFID reading of the second animal 12, i.e., at time point F. The selected beginning weight that is to be considered in calculating the weight of feed consumed during the third consumption event is the weight at the time of the first RFID reading for the third animal 12, i.e., at time point E. The weight difference FG' is described above as an "unaccounted feed disappearance".

In order to help further illustrate Scenario 3, the second consumption event will be considered to have ended at 12:10:00 (time point F) and the weight of feed at that time is considered as being 6000 g. The fourth consumption event will be considered to have started at 12:15:00 (time point G) and the weight of feed at that time is considered as being 5400 g, thus the time difference FG is 300 seconds and the weight difference FG' is 600 g. In accordance with Scenario 3, because the weight difference FG' is greater than the set weight limit value Y, the weight selected as the end weight of the second consumption event is the weight of feed at 12:10:00 (time point F) which is 6000 g. The weight selected as the start weight of the third consumption event is the weight of feed at 12:15:00 (time point G) which is 5400 g. Further, in the example, there would be unaccounted feed disappearance of 600 g.

Although calculating the weight of feed consumed by an animal during a consumption event is known and relatively simple, the same will be described for one of the consumption events in relation to the above scenarios. Generally, to calculate the weight of feed consumed during a consumption event, the weight of feed at the end of the consumption event (end weight) is subtracted from the weight of the feed at the start of the consumption event (start weight). As such, using the weights given in the above scenarios as examples, the weight of feed consumed by the third animal 12 (indicated by crosses) during the third consumption event is calculated by subtracting the weight of the feed at time point D (4700 g) from the weight of the feed at time point G (5400 g), that is, the weight of feed consumed by the third animal 12 (indicated by crosses) during the third consumption event is equal to 700 g.

The times and weights used in these examples for determining the durations of consumption events and the amounts of feed either consumed or unaccounted for are specified for illustrative purposes only and should not be considered to limit actual times and weights used to determine durations of consumption events and the amounts of feed either consumed or unaccounted. The duration of consumption events and the duration of time between consumption events as well as the amounts of feed consumed or unaccounted for would depend on a number of factors such as the type of animals consuming the feed, the number of animals which can partake of the feed or the number of feed troughs available to the animals to name a few.

Since certain changes may be made in the above described improved system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method for automated acquisition of animal consumption data utilizing a system comprising a plurality of consumption stations with each of the plurality of consumption stations comprising a separate radio frequency identification detection antenna, a separate feed trough for containing a desired amount of feed, an associated weighing device for weighing at least the feed contained within the feed trough, and at least one control panel being coupled to each of the radio frequency identification detection antennas and the weighing devices for receiving data therefrom, and the at least one control panel being coupled to a processing computer for processing the collected data, the method comprising the steps of:

measuring a weight of the feed contained within the feed trough with the associated weighing device;

periodically transmitting weight measurement data from each of the separate weighing devices to the processing computer;

periodically transmitting identification data from each of the separate detection antenna to the processing computer;

collecting and storing the weight measurement data and the identification data together with time stamp information indicating when the weight measurement data and the identification data was collected;

eliminating, with the computer, inaccurate weight measurements of the feed from the stored weight measurement data prior to processing of the stored weight measurement data;

processing the stored weight measurement data once a sufficient amount of data is collected to determine subsequently a starting weight of the feed within the feed trough and an end weight of the feed within the feed trough in order to determine an amount of feed consumed by the animal during a consumption event to monitor multiple behavior, health and efficiency parameters animal.

2. The method according to claim 1, further comprising the step of periodically transmitting weight measurement data, from each of the separate weighing devices, and identification data from each of the separate detection antenna a plurality of times per minute.

3. The method according to claim 1, further comprising the step of periodically transmitting weight measurement data, from each of the separate weighing devices, and identification data from each of the separate detection antenna about once every second.

4. The method according to claim 1, further comprising the step of calculating the starting weight of the feed within the feed trough and the ending weight of the feed within the feed trough by using a mathematical weighted filter.

5. The method according to claim 1, further comprising the steps of collecting identification information from a plurality of radio frequency identification tags, each of the identification tags being individually introduced at the feeding station and associated with a respective consumption event such that each consumption event is associated with an individual identification tag; and calculating, with the computer, the starting weight from a plurality of weight measurements measured before a respective one of the consumption events and the ending weight from a plurality of weight measurements measured after the respective one of the consumption events.

6. The method according to claim 1, further comprising the step of defining the ending weight of a first consumption event as the starting weight of a second consumption event, if a range of the plurality of weight measurements measured after the first consumption event and before the second consumption event is less than a limit value.

7. The method according to claim 1, further comprising the step of connecting a plurality of radio frequency identification antennas to only a single radio frequency identification reader.

8. A method for automatically acquiring animal consumption and behavior data using a system comprising at least one station where consumables are being fed to an animal, the station being equipped with RFID equipment and weighing devices, the method comprising the steps of:

measuring the weight of the consumables contained within a feed trough with the weighing devices;

reading identification data from an RFID tag fixed to the animal with the RFID equipment when the animal is in close proximity of the weighing device;

connecting the RFID equipment and the weighing device to a computer and transferring weight data from the weighing devices and the identification data from the RFID equipment to the computer;

calculating, with the computer, a weight of the consumables at a specific time point using the weight data which was measured before and after the specific time point to enhance the accuracy of a weight of the consumables at the specific time point;

computing, with the computer, the weight of the consumables before and after a feeding event using a mathematical weighted filter technique; and dividing, with the computer, a difference in the weight of the consumables at a time of the last reading of the identification data from the RFID tag of a prior animal to a time of a subsequent reading of the identification data from the RFID tag of a subsequent animal, if the difference in the weight of the consumables is less than a specified amount.

9. The method according to claim 8, further comprising the step of connecting a plurality of RFID antennas to one RFID reader.

10. The method according to claim 8, further comprising the step of auditing, with a computer, the accuracy of the weight measurements of the consumables by calculating a total amount of matter being added divided by a sum of all the feeding events for a certain period of time.

11. The method according to claim 10, further comprising the step of calculating, with the computer, an ideal time base filter to use as the mathematical weighted filter technique for the certain time period by iterating a time base to find a correct range of consumables disappearance.

12. The method according to claim 10, further comprising the step of calculating, with the computer, individual animal consumption daily and divides this into behavioral time events such as feeding frequency and duration and location of these feeding events and further dividing these feeding events into classes of behavioral events such as head down duration and grazing frequency.

13. The method according to claim 10, further comprising the step of determining, with the computer, from the weight data and the identification data at least one of an animal that feeds first after feed supply, an animal that is displaced from a feeding station during a feeding event, an animal which takes precedence, a feeding rate during a feeding event, a bite size, an amount of pressure exerted on feed trough while taking a bite, a duration of pressure exerted while taking a bite, a frequency of taking bites during a feeding event, patterns of frequency, duration pressure, intake and competitive behavior.

14. The method according to claim 10, further comprising the step of automatically calculating an amount of consumables supplied to each feeding station and a time at which the feeding station was supplied with consumables.

15. The method according to claim 10, further comprising the step of automatically auditing the weight data collected by calculating a difference in total amount of consumables supplied minus a sum of all the feeding events on a percentage bases, and calculating a total sum of all consumable appearances or disappearances between the feeding events on a percentage bases of the total amount of consumables supplied and referring to the percentage as accounted feed disappearance.

16. The method according to claim 10, further comprising the step of automatically performing, with the computer, statistical process control on RFID samples collected, a resonant voltage of RFID antenna, and a number of weight samples collected.

17. The method according to claim 8, further comprising the step of calculating an intake of consumables during a noted feeding event by determining an initial consumables weight at a start of the noted feeding event by taking a filtered weight of the consumables at a first time point time halfway between an end of a prior feeding event and the start of the noted feeding event, and determining an ending weight of the noted feeding event by taking the filtered weight of the consumables at a second time point halfway between the first reading of a next feeding event and a time of the last reading of the noted feeding event; and validating the filtered weight of the consumables at the first and the second time points by taking the filtered weight of the consumables at the end of the prior feeding event and subtracting this from the filtered trough weight of the consumables at the start of the noted feeding event and when the value exceeds a predetermined amount, the filtered weight of the consumables at the start of the noted feeding event is used as a starting weight of the noted feeding event to be measured.

18. A method of automated acquisition of animal consumption data utilizing a system comprising a plurality of separate consumption stations, and each of the plurality of separate consumption stations permitting consumption of feed by only a single animal at a time and each separate consumption station comprising a unique consumption station identification, a respective feed trough for containing a desired amount of feed, a respective feed weighing device for weighing the feed contained within the respective feed trough and a respective radio frequency identification detection antenna for detecting identification data of the animal consuming feed at the respective consumption station, and system further comprising at least one control panel coupled to each of the respective radio frequency identification detection antennas and each of the respective weighing devices for receiving data therefrom, and the at least one control panel being coupled to a processing computer for processing the received data, the method comprising the steps of:

periodically transmitting feed weight measurement data from each of the respective feed weighing devices to the processing computer;

periodically transmitting to the processing computer, via the respective radio frequency identification detection antenna, the respective consumption station identification and the animal identification data of any animal located at the respective consumption station;

collecting and storing the feed weight measurement data, the animal identification data and the consumption station identification data together with time stamp information which indicates when each of the weight measurement data, the animal identification data and the consumption station identification data was collected;

following collection and storage of the data, processing the stored time stamp feed weight measurement data, the animal identification data and the consumption station identification data, for each one of the respective consumption stations, to determine each feeding event;

for each determined feeding event, averaging feed weight measurement data at a time when the determined feeding event commences, feed weight measurement data before the determined feeding event commenced and feed weight measurement data after the determined feeding event commenced to calculate an initial weight of the feed contained within the respective feed trough at commencement of the determined feeding event;

compiling feed weight measurement data at a time when the determined feeding event terminates, feed weight measurement data before the determined feeding event terminated and feed weight measurement data after the determined feeding event terminated to calculate a final weight of the feed contained within the respective feed trough after termination of the determined feeding event; and determining the amount of feed consumed by each animal, during each determined feeding event, by subtracting the initial weight of the feed contained within the respective feed trough at commencement of the determined feeding event from the final weight of the feed, contained within the respective feed trough after termination of the determined feeding event to monitor multiple behavior, health and efficiency parameters of each animal.

19. The method according to claim 18, further comprising the steps of:

determining the amount of feed consumed by each animal, during each determined feeding event, by calculating the initial feed weight and the final feed weight, of each determined feeding event, by utilizing using a mathematical weighted filter comprising a set of feed weight measurement values; and arranging the set of feed weight measurement values from a lowest value to a highest value and selecting a desired one of the arranged set of feed weight measurement values as the an initial weight of the feed or as the final weight of the feed.

20. The method according to claim 19, further comprising the step of further comprising the step of defining the final feed weight of a first consumption event as the initial feed weight of a second consumption event, if a range of the plurality of weight measurements measured after the first consumption event and before the second consumption event is less than a threshold value.

* * * * *